Oct. 20, 1953  O. C. BLOMGREN  2,656,083
TIRE ADAPTER
Filed May 23, 1950
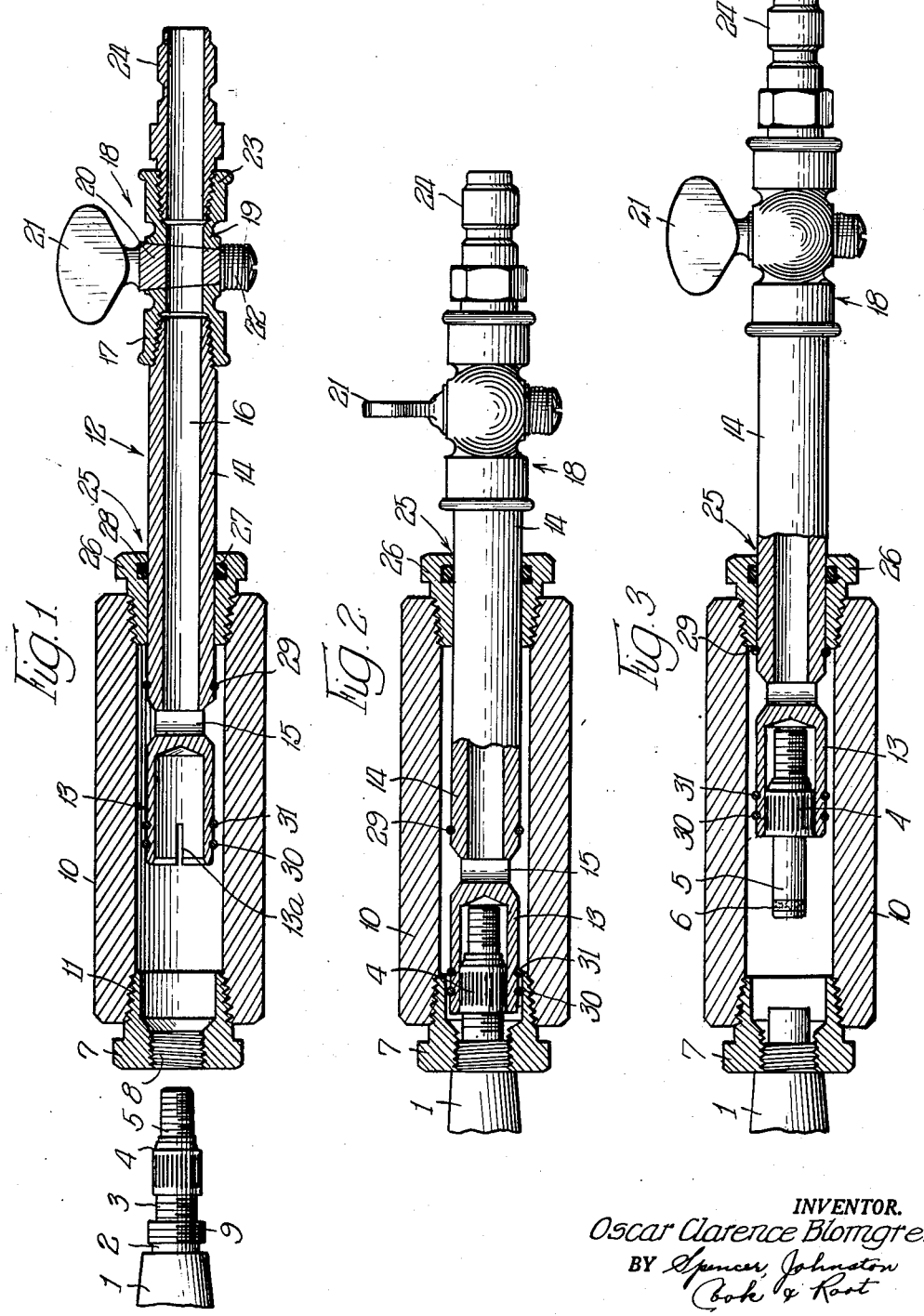
INVENTOR.
Oscar Clarence Blomgren,
BY Spencer Johnston
Cook & Root
Attys.

Patented Oct. 20, 1953

2,656,083

UNITED STATES PATENT OFFICE 2,656,083

TIRE ADAPTER

Oscar Clarence Blomgren, Evanston, Ill.

Application May 23, 1950, Serial No. 163,610

6 Claims. (Cl. 226—20.8)

This invention relates to an adapter for connection to a valve casing of a tire to remove and replace the valve and to fill the tire with liquids or to remove liquids from the tire, all while maintaining liquid-tight engagement with the valve casing.

The practice of filling the tires of automotive equipment with liquids is becoming more prevalent, particularly with respect to heavy equipment such as tractors and trucks. On such equipment the tires may be of the self-sealing type or they may contain an inner tube. Water serves quite satisfactorily as the filling liquid under most circumstances, but temperature conditions may require the employment of non-freezing liquids such as may be obtained by adding to the water an organic or inorganic freezing point depressant. Calcium chloride brines are extensively used for this purpose.

Since tires and tubes are manufactured with a valve intended for use with gases, it is necessary to provide an adapter for the introduction of liquids into the tires. Such an adapter should provide a tight connection between a liquid source and the valve casing and should also provide means for removing the valve core and its housing without breaking the connection to the casing.

An object of the present invention is to provide a tire filling adapter of the type described which is simple and easy to operate.

Another object is to provide a tire filling adapter which is light in weight and readily portable.

A further object is to provide a tire filling adapter which may be easily connected and disconnected without tools to a tire valve casing and to a suitable source of liquid.

These and other objects and advantages of the invention will be further described in connection with the accompanying drawings in which:

Figure 1 is a longitudinal cross sectional view of the tire filling adapter of the invention illustrated in disconnected position with respect to a tire valve;

Figure 2 is a longitudinal cross sectional view of the tire filling adapter connected to the valve casing in position for removal of the valve core and its housing, and Figure 3 is a longitudinal cross-sectional view of the tire filling adapter in fluid dispensing position after removal of the valve core and its associated housing from the tire valve casing.

The adapter provided according to the invention is novel and unusual in that the housing for the operatively associating parts of the adapter is of a clear transparent material thereby making possible the observation of the mechanical operations and the passage of the liquid under pressure into the tire. The adapter is further characterized in that the valve removing means and the liquid inlet means are each part of the same member and enter the housing through a single opening. The above features render the device simple and positive in operation while at the same time providing lightness and portability.

Referring to the drawings, the adapter is shown in connection with the conventional valve mounted on a tire. The valve casing 1 is adapted to be connected with the body of the tire (not shown) and to extend outwardly therefrom. At the upper end of the valve casing 1 is a portion 2 which is externally threaded at 3 to engage corresponding internal threads on a knurled cap 4. The cap 4 is fixed to the valve core housing 5 into which is fitted the valve core (not shown). One end of the housing 5 fits into the valve casing 2 in fluid-tight engagement therewith as provided by the neoprene packing ring 6 (Fig. 3) mounted on the valve housing 5. The outer end of the housing 5 is externally threaded to receive a valve cap (not shown).

When it is desired to fill the tire with liquid, the adapter is brought into position with respect to the tire valve assembly, and the valve assembly is inserted into one of the fittings in the adapter. A liquid tight seal is effected between the fitting 7 of the adapter and the valve by means of the internal threads 8 on the fitting 7 and the external threads 9 on the casing 2. The fitting 7 is secured in the transparent plastic housing 10 by means of the threads 11 therein. The transparent plastic housing 10 is tubular in shape and is of sufficient thickness and strength to withstand the pressures encountered in the filling operation.

A combined liquid filling means and valve positioning means 12 is inserted into an opening in the end of the housing 10 opposite the valve receiving end and is slidable therein. The element 12 has a valve holding portion 13 and a tubular portion 14. The valve holding portion 13 consists of a tubular member closed at one end and provided with one or more slits or openings 13a in the sides thereof extending inwardly from the open end.

A passageway 15 extends transversely through the member 14 and connects with one end of a longitudinal passage 16. The outer end of the element 12 is externally threaded to be received into the female fitting 17 of a valve 18.

The valve 18 is a simple shut-off valve of the petcock type having a body 19 in which is seated a rotatable petcock 20 having a winged handle 21 and held in place by the spring and bolt means 22. The other female fitting 23 of the valve 18 is adapted to receive a coupler plug 24 preferably of the type adapted to receive a snap-on fitting of a hose connected to a pump or other source of liquid under pressure.

The element 12 is adapted to move longitudinally with respect to the plastic housing 10 in an opening 25 in a fitting 26. This fitting threadedly engages one of the openings in the plastic housing 10. In order to provide for slidable movement of the element 12 within the fitting 26, while at the same time maintaining a fluid tight engagement between the two, the O-ring seal 27 (or a washer) is positioned in a recess 28 in the body of the fitting 26. The outward longitudinal movement of the element 12 is restricted by the protruding metal ring 29 so that it may not be accidentally withdrawn from the fitting 26. The ring 29 is seated in a groove in the element 12 and acts as a stop when it strikes against the inner end of the fitting 26 (see Figure 3).

In the use of the adapter for filling tires with liquid ballast the open end of the fitting 7 is screwed onto the threads 9 of valve casing 1 until a liquid tight connection is made. At this point the movable element 12 will be approximately in the position illustrated in Figure 1. The element 12 is then advanced toward the valve by sliding it forward in the plastic housing 10 until the valve holding means 13 engages the knurled surface of the cap 4 in tight frictional engagement. This position is illustrated generally in Figure 2 of the drawings.

The gripping action is facilitated by the rings 30 and 31 seated in recesses around the outside of the member 13. As the element 12 is pushed toward the valve the rings 30 and 31 strike against the interior of the passageway in fitting 7 and compress the sides of member 13 inwardly thereby exerting increased pressure on the knurled cap 4. The slits 13a provide space for the sides of the member 13 to move inwardly to tighten the grip on the cap 4 and later to release it without permanent distortion.

The element 12 is then rotated about its axis in a counter-clockwise direction to thereby unscrew the union cap 4 from the valve casing 2. When the casing and the cap have become disengaged, the element 12 is retracted from the position shown in Figure 2 to the position of Figure 3. It will be noted that the valve positioning means 13 carries with it the union cap 4 and the valve housing 5. At this point there remains no obstruction between the interior of the housing 10 and the interior of the tire, so that fluids may flow freely between the two.

The coupler plug 24 is now inserted into the liquid supply line (not shown) and a fluid tight engagement is effected. A supply of liquid under pressure is then introduced into the main supply line and through the coupler 24 to the shut-off valve 18. After it has been determined that all of the fittings are liquid tight, the valve 18 is opened and the liquid under pressure is allowed to flow through the passageway 16 in tube 14 and the passageway 15 from whence it will pass into the open chamber of the housing 10 and into the tire through casing 1. The operator may determine the visual observation through the transparent housing, or by other suitable means when the desired amount of liquid has been introduced into the tire.

When the tire is filled, the shut-off valve 18 is closed and the coupler 24 is disconnected from the liquid supply line. The element 12 is then advanced so that the valve holding means 13 moves forward within the housing 10, until the valve housing 5 is once again in position within the valve casing 1. The element 12 is rotated in a clockwise direction in order to screw the union cap 4 onto the threaded end 3 of the valve casing 2. When this is done, the liquid under pressure in the tire is positively confined by the normal operation of the valve. The adapter may then be disconnected from the valve casing by unscrewing it from the threaded portion 9 and the tire will be ready for use.

While the foregoing description has been limited to the process of filling a tire with liquid, it will be understood that the adapter is equally suitable for use in exhausting liquid from a tire. This may be important where an expensive liquid is being employed and it is desirable to maintain positive control over the liquid for recovery purposes.

It will be apparent that the type of materials to be used in the manufacture of an adapter of the type described will be dictated largely by the character of the liquid to be handled. Thus, if water is to be used the metal fittings may be made of iron, steel or aluminum and the gasket and sealing materials may be ordinary rubber or other well known packing materials. If, however, a corrosive liquid such as a calcium chloride brine is to be employed, the metal parts are preferably made of stainless steel, brass or other corrosion resisting metals and alloys. Similarly, the packing materials will be of neoprene. The transparent plastic housing may be made of any of the transparent plastics available commercially, such as the methacrylate resins (Lucite), cellulose acetate or certain of the vinyl resins. In most instances these plastics are corrosion resisting in nature and may be employed regardless of the type of liquid to be dispensed.

From the foregoing it will be apparent that the invention provides a novel and useful adapter for filling a tire with liquid, which adapter will be light in weight, easily transportable and easy to operate. The device further provides for visual determination of the progress of the filling operation and of the connecting and disconnecting steps.

The invention is hereby claimed as follows:

1. A tire filling adapter comprising an elongated housing having a longitudinal bore adapted to enclose a tire valve, means for connecting one end of said housing in liquid-tight engagement with a tire valve casing when said valve is enclosed within said bore, an elongated plunger partly enclosed within and rotatingly and longitudinally movable relative to said housing and projecting from the remaining end of said housing, and means forming a liquid-tight seal between said remaining end of said housing and said plunger while permitting rotation and longitudinal movement of the latter, said plunger being constructed at its enclosed end to grip a valve for rotation of the latter and having a longitudinal bore from its projecting end to a portion enclosed within said housing, said plunger and said housing being constructed to provide a liquid passageway within said housing from said plunger bore to said enclosed end of said plunger, and the said projecting end of said plunger being adapted for connection to a source of liquid.

2. A tire filling adapter as defined in claim 1 wherein the said housing is constructed of transparent material.

3. In a tire filling adapter as defined in claim 1, the construction wherein the said plunger is provided with a slotted tubular portion at its enclosed end adapted to grip a valve for rotation of the latter, and means are provided for compressing the said tubular portion when in gripping engagement with a seated valve.

4. In a tire filling adapter as defined in claim 1, the construction wherein a flow valve is attached to the said projecting end of said plunger.

5. A tire filling adapter comprising an elongated housing having a longitudinal bore adapted to enclose a tire valve, means for connecting one end of said housing in liquid-tight engagement with a tire valve casing when said valve is enclosed within said bore, an elongated plunger partly enclosed within and rotatingly and longitudinally movable relative to said housing and projecting from the remaining end of said housing, and means forming a liquid-tight seal between said remaining end of said housing and said plunger while permitting rotation and longitudinal movement of the latter, said plunger being constructed at its enclosed end to grip a valve for rotation of the latter and having a longitudinal bore from its projecting end to a portion enclosed within said housing and also having a transverse bore in an enclosed portion extending to its outer surface and communicating with said last-named longitudinal bore, the inner surface of said housing and the outer surface of said plunger between said transverse bore and said enclosed end being constructed to provide a liquid passageway between the latter two, and the said projecting end of said plunger being adapted for connection to a source of liquid.

6. A tire filling adapter comprising a generally tubular housing constructed of transparent material and adapted to enclose a tire valve, means for connecting one end of said housing in liquid-tight engagement with a tire valve casing when said valve is enclosed within said housing, a generally tubular plunger partly enclosed within said housing in spaced relation thereto and projecting from the remaining end of said housing, means forming a liquid-tight seal between said remaining end of said housing and said plunger while permitting rotation and longitudinal movement of the latter, said plunger having a slotted tubular portion at its enclosed end adapted to grip a valve for rotation of the latter and having a longitudinal bore from its projecting end to a portion enclosed within said housing and also having a transverse bore in an enclosed portion extending to its outer surface and communicating with said longitudinal bore, the said projecting end of said plunger being adapted for connection to a source of liquid, and means for compressing the said slotted tubular portion when in gripping engagement with a seated valve.

OSCAR CLARENCE BLOMGREN.

References Cited in the file of this patent

UNITED STATES PATENTS

| Number | Name | Date |
|---|---|---|
| 987,000 | Lukens | Mar. 14, 1911 |
| 1,869,282 | Schwartz | July 26, 1932 |
| 2,125,554 | Franck | Aug. 2, 1938 |
| 2,320,042 | McMahon | May 25, 1943 |
| 2,370,182 | Morrow | Feb. 27, 1945 |
| 2,502,301 | Alderfer | Mar. 28, 1950 |

FOREIGN PATENTS

| Number | Country | Date |
|---|---|---|
| 259,631 | Switzerland | July 1, 1949 |